US006786085B1

(12) United States Patent
Kroiss et al.

(10) Patent No.: US 6,786,085 B1
(45) Date of Patent: Sep. 7, 2004

(54) FUEL SUPPLY SYSTEM FOR A MOTOR VEHICLE

(75) Inventors: Hugo Kroiss, Groebenzell (DE); Simon Loesch, Wartenberg (DE); Christian Treml, Munich (DE); Georg Wissenbach, Berg (DE); Henning Bode, Einbeck (DE); Juergen Turini, Maisach (DE); Michael Hofrichter, Vatorstotten (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/700,172

(22) PCT Filed: Feb. 25, 2000

(86) PCT No.: PCT/EP00/01599

§ 371 (c)(1),
(2), (4) Date: Dec. 28, 2000

(87) PCT Pub. No.: WO00/55489

PCT Pub. Date: Sep. 21, 2000

(30) Foreign Application Priority Data

Mar. 12, 1999 (DE) ........................................ 199 11 068

(51) Int. Cl.[7] ............................................. G01M 15/00
(52) U.S. Cl. ..................................................... 73/118.1
(58) Field of Search ................................ 73/116, 117.2, 73/117.3, 118.1, 119 A

(56) References Cited

U.S. PATENT DOCUMENTS

| | | | | | |
|---|---|---|---|---|---|
| 4,276,161 | A | * | 6/1981 | Matsui et al. | 210/138 |
| 4,491,272 | A | * | 1/1985 | Bradley et al. | 239/104 |
| 4,649,950 | A | * | 3/1987 | Bradley et al. | 137/549 |
| 5,647,329 | A | * | 7/1997 | Bucci et al. | 123/509 |
| 6,098,599 | A | * | 8/2000 | Muldoon et al. | 123/457 |
| 6,213,726 | B1 | * | 4/2001 | Tuckey | 417/199.1 |
| 6,281,020 | B1 | * | 8/2001 | Usui | 134/113 |

FOREIGN PATENT DOCUMENTS

| | | |
|---|---|---|
| DE | 25 05 925 | 8/1976 |
| DE | 3718068 | 6/1988 |
| DE | 19723329 | 12/1998 |
| EP | 0 189 314 | 7/1986 |
| GB | 2 009 845 | 6/1979 |

* cited by examiner

*Primary Examiner*—Eric S. McCall
(74) *Attorney, Agent, or Firm*—Crowell & Moring LLP

(57) ABSTRACT

To prevent the dirt present in the fuel from depositing on the filter material so that the resistance to the flow through the filter material rises continuously overtime, a fuel system for a vehicle is provided in such a way that the throughflow resistance of the fuel filter remain almost constant. This is achieved as a result of the formation of a deposition tank in a housing of the fuel filter under the filter material located in a housing, in which the dirt from the fuel is deposited and as a result of a pressure accumulator in the fuel system causes the fuel stored in pressure accumulator to rinse the fuel filter after the engine has been switched off.

13 Claims, 2 Drawing Sheets

FUEL SUPPLY SYSTEM FOR A MOTOR VEHICLE

BACKGROUND AND SUMMARY OF THE INVENTION

Figure 1:
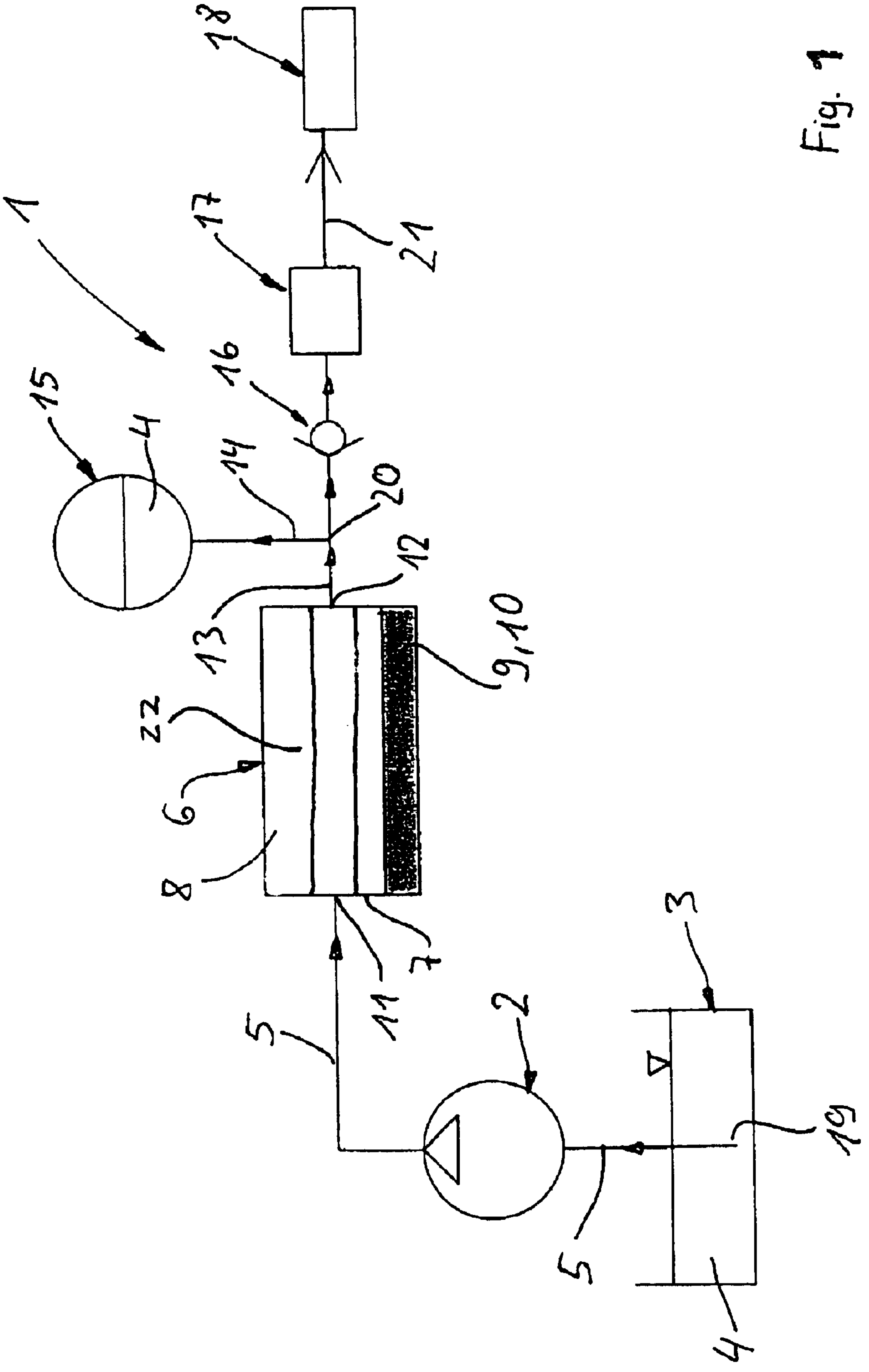

The present invention relates to a fuel system for a motor vehicle with a fuel container from which a fuel pump transports fuel via fuel pipelines from a system input location in the fuel contain via a fuel filter towards a motor.

Fuel systems for motor vehicles are already known in which a fuel filter is provided, where the fuel filter can be installed inside and/or outside a fuel container. The fuel flow through these filters is only ever in one direction. Because of this, the dirt contained in the fuel is increasingly deposited over time on the inflow side of the filter. If there is a large amount of dirt in the fuel, a filter cake can form which leads to an increase in throughflow resistance. This means that the demands on the performance of the fuel pump within the fuel system also increase.

This aim of the present invention is to create a fuel system for a motor vehicle in which the throughflow resistance does not increase over the lifetime of the vehicle or increases only relatively slightly.

This aim is fufilled by a deposition tank formed into a housing of the fuel filter under a filter material provided in the housing into which dirt filtered out of the fuel is deposited and a pressure accumulator is installed in the fuel system which after the motor is switched off, the fuel stored in the pressure accumulator rinses the fuel filter.

The fuel system according to the invention exhibits a fuel filter in which a deposition tank is provided. In addition a pressure accumulator is built into the system in such a way that the fuel which is in the pressure accumulator is depressurized after the engine has been switched off and rinses the filter from the fuel outlet side or clean side toward the fuel inlet side or dirt side. By these means the advantage is created that dirt which has collected on the fuel inlet side is released from the filter and collects in the deposition tank.

The deposition tank of the present invention is advantageously formed by means of the structure of the housing, for example by the provision of guide vanes, in such a way that fuel does not flow through the deposition tank and therefore the deposited dirt is not disturbed.

The fuel filter according to the invention can advantageously, be located on either the pressure side or the suction side within the fuel system, in other words, behind or in front of the fuel pump.

In an advantageous embodiment, with the fuel filter located on the pressure side a pressure accumulator is installed in the direction of the engine after an outlet opening of the filter housing, and with the fuel filter located on the suction side after an outlet opening of the fuel pump, and in both cases is installed in front of a pressure regulator with an upstream non-return valve. The positioning of a non-return valve between a branch point leading to the pressure accumulator and the pressure regulator prevents the fuel pipeline to the motor from emptying.

In an advantageous embodiment a delay valve is provided in the fuel system in order that filling of the pressure accumulator does not influence the buildup of pressure in the fuel system after the engine has been started.

The fuel system which is the subject of the present invention is particularly advantageous in that the fuel filter achieves a longer lifetime. A further advantage is that by means of the structure of the fuel filter as embodied in the invention, the filter volume can be decreased in comparison with a known fuel filter while maintaining the same lifetime.

Because the fuel filter is cleaned each time the engine is switched off, the volume throughflow resistance of the fuel filter remains approximately constant. Therefore, the fuel pump of the fuel system only needs to exert normal pressure and not increased pressure as is the case with a blocked fuel filter, so that the lifetime of the fuel pump is higher in comparison with fuel systems with traditional fuel filters.

A further advantage is that the fuel filter, the pressure regulator, the fuel pump, the non-return valve, the pressure accumulator and possibly the surge chamber can be implemented in the form of a preassembled unit, and therefore the emissions are also less.

Several embodiments of the invention are described as examples in the following text with reference to the drawing.

Figure 2:
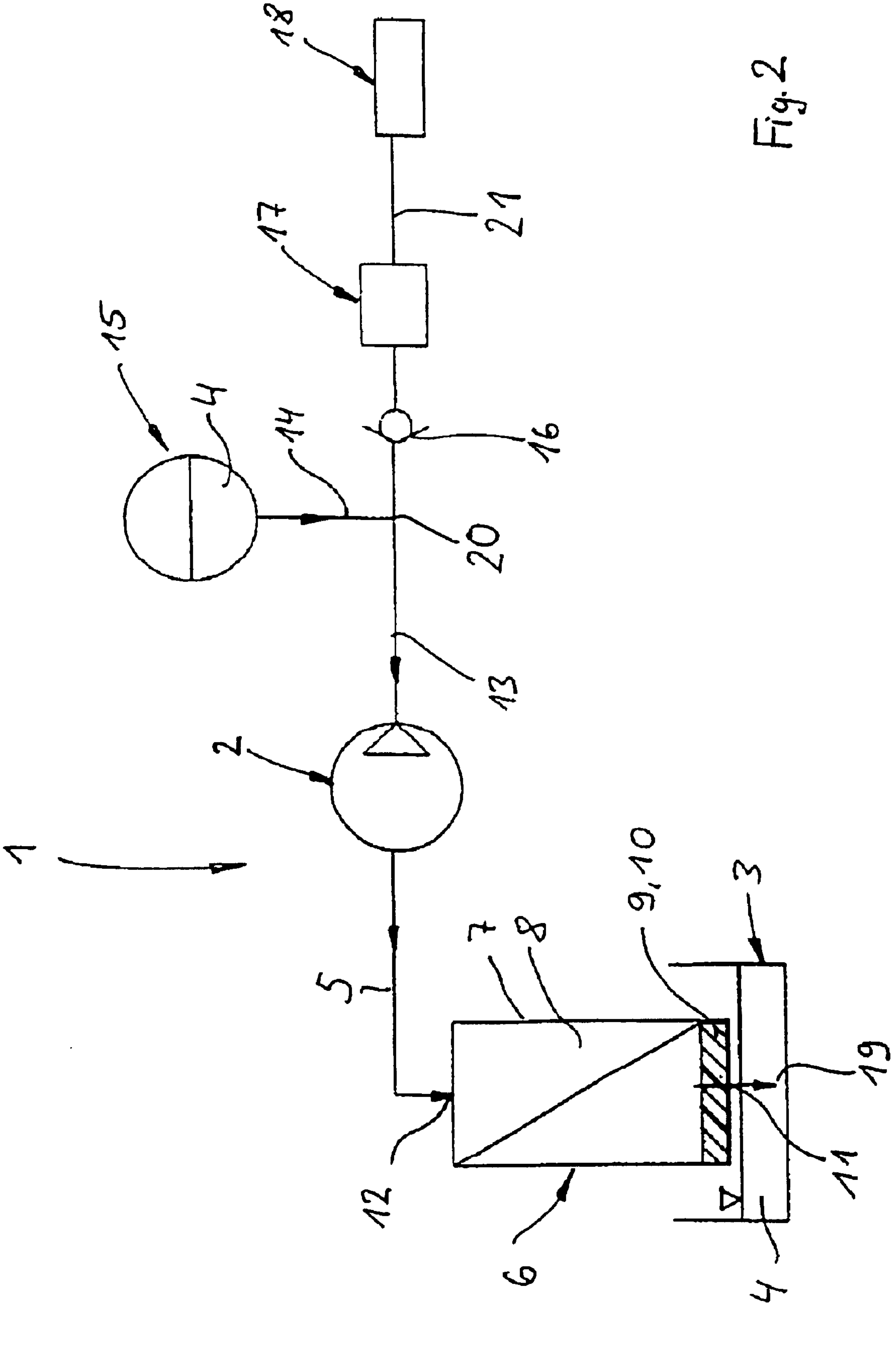

FIG. 1 shows a basic diagram of a fuel system, where the fuel filter is located on the pressure side; and FIG. 2 shows a basic diagram of a fuel system, where the fuel filter is provided on the suction side.

DETAILED DESCRIPTION OF DRAWINGS

FIG. 1 shows a first embodiment of a fuel system 1 where a fuel pump 2 transports fuel 4 from a fuel container 3 for example via a surge chamber which is not shown by means of fuel pipelines 5 to a fuel filter 6. The fuel filter 6 exhibits a housing 7 in which a filter material 8, for example woven filter material or filter paper, is located.

Beneath the filter material 8 a deposition tank 9 is formed into housing 7 which is arranged or protected so that fuel 4 flowing through filter material 8 does not influence dirt 10 collecting in deposition tank 9. For example, guide vanes or walls 22 can be provided in housing 7 which prevent swirling up of the dirt 10 in deposition tank 9 due to the fuel flow.

In the embodiment show in FIG. 1, fuel filter 6 exhibits at least one inlet opening 11 on housing 7 for the fuel 4 to be cleaned and at least one outlet opening 12 from which the cleaned fuel 4 flows into pipeline 13. The filter material 8 next to the inlet opening 11 becomes dirty most quickly and for this reason this side of filter material 8 is referred to as the dirt side A pipeline 14 leading to a pressure accumulator 15 is connected to pipeline 13 at a branch point 20. The cleaned fuel 4 flows via a non-return valve 16 and a pressure regulator 17 connected to it through pipeline 21 to engine 18.

When the engine 18 is running, the fuel pump 2 transports a predetermined volume of fuel 4 into pressure accumulator 15, which can, for example, be in the form of a membrane pressure accumulator. After the engine 18 is switched off, the pressure accumulator 15 is depressurized so that the fuel 4 which is located in pressure accumulator 15 flows back via pipeline 13 and through outlet opening 12 into fuel filter 6 and there rinses the filter material 8 so that the dirt 10 which has particularly collected on the dirt side of filter material 8 is released and arrives in deposition tank 9 via appropriate means. The fuel 4 which rinses the filter material then flows back through inlet opening 11, pipelines 5, through fuel pump 2 to the inlet point 19 in fuel container 3. Because of the location of non-return valve 16 between branch point 20 to pressure accumulator 15 and pressure regulator 17, pipeline 21 to engine 18 is not emptied during rinsing of fuel filter 6.

The second embodiment of fuel system 2 shown in FIG. 2 differs from the first embodiment of the fuel system 1 shown in FIG. 1 in that fuel filter 6 is positioned on the suction side. A further difference between the two figures is in the flow direction of fuel 4 which is shown. While in FIG. 1 fuel system I is shown with engine 18 running, as indicated by the flow direction of fuel 4 shown by arrows, FIG. 2 shows fuel system 1 after engine 18 has been switched off, where the fuel 4 located in pressure accumulator 15 flows back through fuel pump 2 and fuel filter 6 into fuel container 3, as is also indicated by arrows.

Fuel pump 2 accordingly pumps fuel 4 out of fuel container 3 through fuel filter 6 and transports this fuel 4 via a non-return valve 16 and a pressure regulator 17 to engine 18. In addition, when engine 18 and fuel pump 2 are in operation, a predetermined volume of fuel 4 is transported to pressure accumulator 15.

In both embodiments a delay valve can be provided in branch pipeline 14, so that pressure accumulator 15 is filled with fuel 4 with a time delay after starting of engine 18.

What is claimed is:

1. Fuel system for a motor vehicle with a fuel container from which a fuel pump transports fuel via fuel pipelines from a system input location in the fuel container via a fuel filter towards an engine, wherein a deposition tank is formed into a housing of the fuel filter under a filter material, which is provided in the housing, into which said tank dirt filtered out of the fuel is deposited, wherein a pressure accumulator is installed in the fuel system which accumulates and stores fuel when the engine is running and after the engine is switched off, the fuel stored in the pressure accumulator rinses the fuel filter to thereby operatively deposit said dirt into said tank, and wherein a delay valve is installed upstream of the pressure accumulator, so that after starting of the engine the pressure accumulator is filled with the fuel subject to a time delay.

2. Fuel system according to claim 1, wherein a portion of the fuel pump into the pressure accumulator when the engine is running, and after the engine has been switched off, the fuel stored in the pressure accumulator is flowable through the fuel filter removing the dirt deposited in the filter material.

3. Fuel system for a motor vehicle with a fuel container from which a fuel pump transports fuel via fuel pipelines from a system input location in the fuel container via a fuel filter towards an engine, wherein a deposition tank is formed into housing of the fuel filter under a filter material, which is provided in the housing, into which said tank dirt filtered out of the fuel is deposited, wherein a pressure accumulator is installed in the fuel system which accumulates and stores fuel when the engine is running and after the engine is switched off, the fuel stored in the pressure accumulator rinses the fuel filter to thereby operatively deposit said dirt into said tank, and wherein a non-return valve is provided in the fuel pipeline leading to the engine after a branch point at which the fuel pipeline leading to the pressure accumulator is located.

4. Fuel system for a motor vehicle with a fuel container from which a fuel pump transports fuel via fuel pipelines from a system input location in the fuel container via a fuel filter towards an engine, wherein a deposition tank is formed into a housing of the fuel filter under a filter material, which is provided in the housing, into which said tank dirt filtered out of the fuel is deposited, wherein a pressure accumulator is installed in the fuel system which accumulates and stores fuel when the engine is running and after the engine is switched off, the fuel stored in the pressure accumulator rinses the fuel filter to thereby operatively deposit said dirt into said tank, and wherein a pressure regulator is provided towards the engine from a non-return valve.

5. Fuel system according to claim 3, wherein a pressure regulator is provided towards the engine from the non-return valve.

6. Fuel system according to claim 4, wherein the fuel filter is connected to the fuel pump on a pressure side of the pump.

7. Fuel system according to claim 4, wherein the fuel filter is connected to the fuel pump on a suction side of the pump.

8. Fuel system according to claim 1, wherein the fuel filter is connected to the fuel pump on a pressure side of the pump.

9. Fuel system according to claim 1, wherein the fuel filter is connected to the fuel pump on a suction side of the pump.

10. A fuel system for a motor vehicle with a fuel container from which a fuel pump transports fuel via fuel pipelines from a system input location in the fuel container via a fuel filter towards an engine, wherein a deposition tank is formed into a housing of the fuel filter under a filter material, which is provided in the housing, into which said tank dirt filtered out of the fuel is deposited, wherein a pressure accumulator is installed in the fuel system which accumulates and stores fuel when the engine is running and after the engine is switched off, the fuel stored in the pressure accumulator rinses the fuel filter, wherein a pressure regulator is provided towards the engine from a non-return valve, wherein the fuel filter is connected to the fuel pump on a pressure side of the pump, and wherein a delay valve is installed upstream of the pressure accumulator, so that after starting of the engine the pressure accumulator is filled with the fuel subject to a time delay.

11. Fuel system according to claim 10, wherein, in the housing, guide vanes are provided which prevent the fuel flowing through the filter material from touching or disturbing the dirt collected in the deposition tank.

12. Fuel system according to claim 3, wherein, in the housing, guide vanes are provided which prevent the fuel flowing through the filter material from touching or disturbing the dirt collected in the deposition tank.

13. Fuel system according to claim 1, wherein, in the housing, guide vanes are provided which prevent the fuel flowing through the filter material from touching or disturbing the dirt collected in the deposition tank.

* * * * *